United States Patent
Shim

(10) Patent No.: US 8,878,962 B2
(45) Date of Patent: Nov. 4, 2014

(54) ZOOM LENS SYSTEM AND PHOTOGRAPHING APPARATUS INCLUDING THE SAME

(71) Applicant: Samsung Techwin Co., Ltd., Changwon (KR)

(72) Inventor: Hyung-Rok Shim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 13/904,076

(22) Filed: May 29, 2013

(65) Prior Publication Data

US 2014/0036117 A1    Feb. 6, 2014

(30) Foreign Application Priority Data

Aug. 3, 2012  (KR) ......................... 10-2012-0085395

(51) Int. Cl.
  *H04N 5/262*    (2006.01)
  *G02B 15/14*    (2006.01)
  *G02B 15/173*   (2006.01)

(52) U.S. Cl.
  CPC ............. *G02B 15/14* (2013.01); *G02B 15/173* (2013.01)
  USPC ....................... 348/240.99; 359/687; 359/683

(58) Field of Classification Search
  USPC .............................. 348/240.99; 359/687, 683
  See application file for complete search history.

(56) References Cited

U.S. PATENT DOCUMENTS

| | | | |
|---|---|---|---|
| 5,296,969 A * | 3/1994 | Mihara | ......................... 359/687 |
| 7,542,212 B2 | 6/2009 | Toyoda et al. | |
| 7,755,845 B2 | 7/2010 | Yamasaki | |
| 7,965,452 B2 | 6/2011 | Li et al. | |
| 2011/0063479 A1 | 3/2011 | Bito et al. | |
| 2011/0157720 A1 | 6/2011 | Katsuragi | |
| 2011/0261467 A1 * | 10/2011 | Arai | .............................. 359/683 |

FOREIGN PATENT DOCUMENTS

| | | | |
|---|---|---|---|
| JP | 2007-322804 A | 12/2007 | |
| JP | 2009-192598 A | 8/2009 | |
| JP | 2009-294388 A | 12/2009 | |
| JP | 2010-160298 A | 7/2010 | |
| JP | 2011-085909 A | 4/2011 | |
| KR | 10-2011-0074645 A | 7/2011 | |

* cited by examiner

*Primary Examiner* — Antoinette Spinks
(74) *Attorney, Agent, or Firm* — Sughrue Mion, PLLC

(57) ABSTRACT

A zoom lens system including: a first lens group having positive refractive power, a second lens group having negative refractive power, a third lens group and a fourth lens group having positive refractive power, wherein an interval between the first and second lens groups, an interval between the second and third lens groups, and an interval between the third and fourth lens groups change during zooming from a wide-mode to a tele-mode, wherein the first lens group comprises one negative lens and three positive lenses sequentially from the object to the image, wherein the zoom lens system satisfies an condition below:

$0.8 < f_{13}/f_{14} < 1$, and wherein $f_{13}$ denotes a focal length of a positive lens of the first lens group disposed second from the image to the object, and $f_{14}$ denotes a focal distance of a positive lens of the first lens group disposed closest to the image.

19 Claims, 10 Drawing Sheets

ZOOM LENS SYSTEM AND PHOTOGRAPHING APPARATUS INCLUDING THE SAME

CROSS-REFERENCE TO RELATED PATENT APPLICATION

This application claims priority from Korean Patent Application No. 10-2012-0085395, filed on Aug. 3, 2012, in the Korean Intellectual Property Office, the disclosure of which is incorporated herein in by reference its entirety.

BACKGROUND

1. Field

Apparatuses consistent with exemplary embodiments relate to a zoom lens and a photographing apparatus including the same.

2. Description of the Related Art

As a solid image capturing device such as a charge-coupled device (CCD) or a complementary metal-oxide semiconductor (CMOS) becomes smaller and still realizes a high pixel resolution, a lens system included in an image forming device such as a digital camera, a video camera, and a surveillance camera including the image capturing device is also required to have improved optical performance and become smaller.

Also, the number of digital camera and surveillance camera users have increased and become more sophisticated with such devices, demand for photographing apparatuses that implement a high magnification and excellent optical performance is increasing. Accordingly, zoom lenses employed in digital cameras and surveillance cameras are required to have high performance and magnification, and be small and light-weight at the same time.

In the related art, since four group type zoom lenses are suitable for achieving 5× or higher magnifications and are relatively small, the constructions of the four group type zoom lenses are suitable to satisfy the above demand, and thus, the four group type zoom lenses are being employed in photographing apparatuses.

Accordingly, various four group type zoom lens designs have been proposed. However, aberration accompanying zooming still increases in the proposed designs when trying to achieve high magnification, and the aberration makes it difficult to realize high optical performance throughout the overall region while switching from a wide-mode to a tele-mode.

SUMMARY

One or more exemplary embodiments provide a zoom lens system that achieves high magnification and has high optical performance, and a photographing apparatus including the zoom lens system One or more exemplary embodiments also provide a zoom lens system that achieves miniaturization and obtains a sufficient back focal distance, and a photographing apparatus including the zoom lens system.

According to an aspect of an exemplary embodiment, there is provided a zoom lens system including, sequentially from an object to an image: a first lens group having positive refractive power, a second lens group having negative refractive power, a third lens group having positive refractive power, and a fourth lens group having positive refractive power, wherein an interval between the first lens group and the second lens group, an interval between the second lens group and the third lens group, and an interval between the third lens group and the fourth lens group change during zooming from a wide-mode to a tele-mode, wherein the first lens group includes one negative lens and three positive lenses sequentially from the object to the image, wherein the zoom lens system satisfies an condition below:

$$0.8 < f_{13}/f_{14} < 1, \text{ and}$$

wherein $f_{13}$ denotes a focal length of a positive lens of the first lens group disposed second from the image to the object, and $f_{14}$ denotes a focal distance of a positive lens of the first lens group disposed closest to the image.

The zoom lens system may satisfy a condition below:

$$4.8 < f_{G3}/f_t < 6.5,$$

wherein $f_{G3}$ denotes a focal length of the third lens group and $f_t$ denotes an overall focal length at the tele-mode.

The zoom lens system may satisfy a condition below:

$$41.5 < f_t/f_w < 44.5,$$

wherein $f_t$ denotes an overall focal length at the tele-mode, and $f_w$ denotes an overall focal length at the wide-mode.

The zoom lens system may satisfy a condition below:

$$Fno_w < 1.5,$$

wherein $Fno_w$ denotes an F number at the wide-mode.

The third lens group may include a positive lens and a negative lens, wherein the positive lens includes at least one aspheric surface.

During the zooming from the wide-mode to the tele-mode, the second and fourth lens groups may move along an optical axis and the first and third lens groups may be fixed.

The zoom lens system may further include an aperture disposed between the second lens group and the third lens group.

The second lens group may include two negative lenses and one positive lens sequentially from the object to the image.

At least one of the two negative lenses included in the second lens group may include an aspheric surface.

The second lens group may include three negative lenses and one positive lens sequentially from the object to the image.

A negative lens and the positive lens that are included in the second lens group and disposed closest to the image may form a cemented lens.

The fourth lens group may include a positive lens and a negative lens sequentially from the object to the image.

The positive lens included in the fourth lens group may satisfy a condition below:

$$Nd_{41} < 1.56,$$

wherein $Nd_{41}$ denotes a refractive index of the positive lens included in the fourth lens group.

The positive lens included in the fourth lens group may include at least one aspheric surface.

The fourth lens group may include one negative lens and two positive lenses sequentially from the object to the image.

The negative lens included in the fourth lens group may include at least one aspheric surface.

The interval between the first lens group and the second lens group increases, the interval between the second lens group and the third lens group decreases, and the interval between the third lens group and the fourth lens group changes during the zooming from the wide-mode to the tele-mode, The interval between the third lens group and the fourth lens group increases and decreases during the zooming from the wide-mode to the tele-mode.

According to another aspect of the present invention, there is provided a photographing apparatus including: the zoom lens system; and an image sensor which receives light from the zoom lens system.

BRIEF DESCRIPTION OF THE DRAWINGS

The above and/or other features and advantages will become more apparent by describing in detail exemplary embodiments thereof with reference to the attached drawings in which.

DETAILED DESCRIPTION

Figure 1:
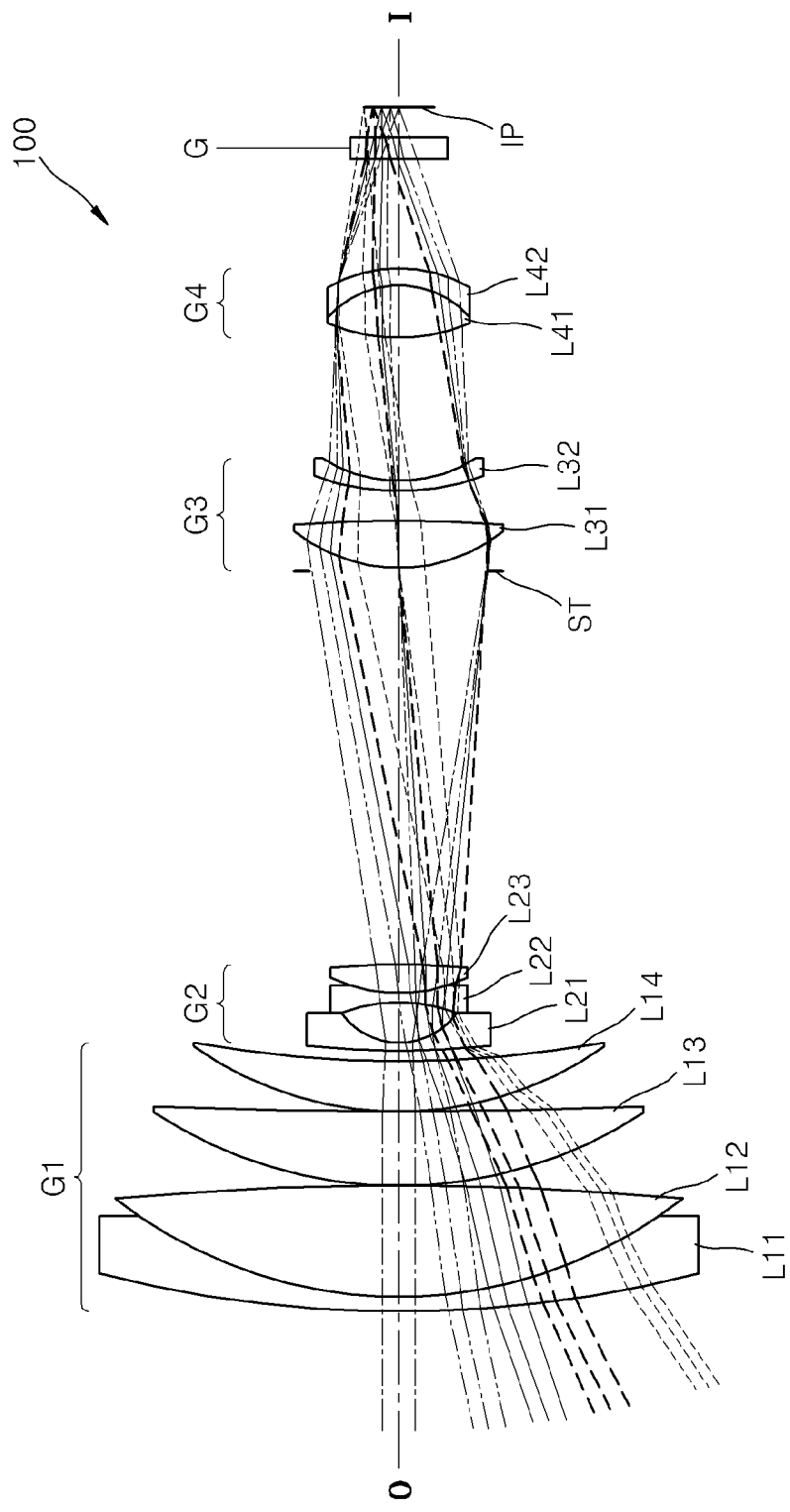
FIG. 1 is a diagram of an optical arrangement of a zoom lens system according to a first exemplary embodiment.

Hereinafter, exemplary embodiments will be described in detail with reference to the attached drawings. In the drawings, like reference numerals in the drawings denote like elements, and the size of each component may be exaggerated for clarity.

Figure 4:
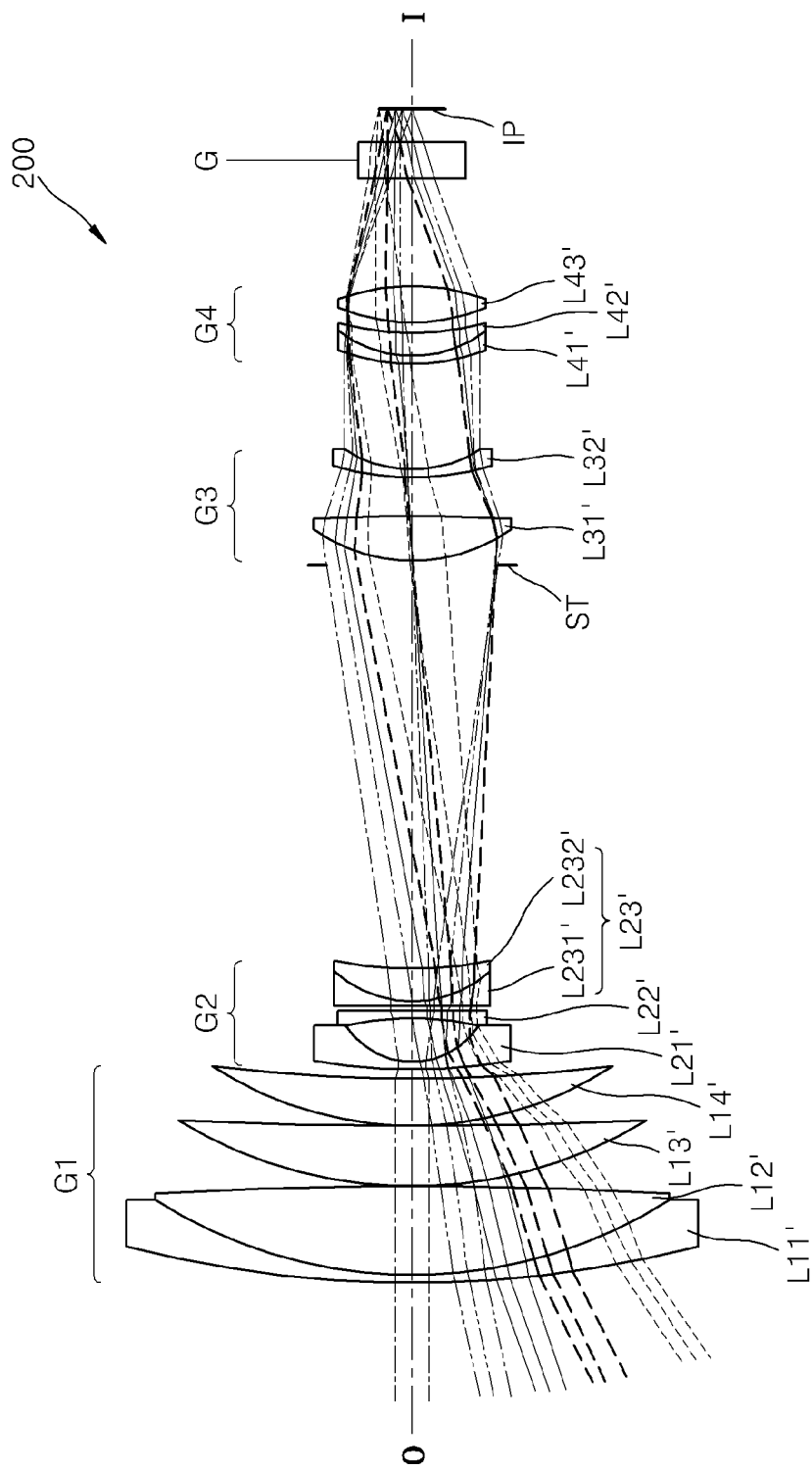
FIG. 4 is a diagram of an optical arrangement of a zoom lens system according to a second exemplary embodiment.
Figure 7:
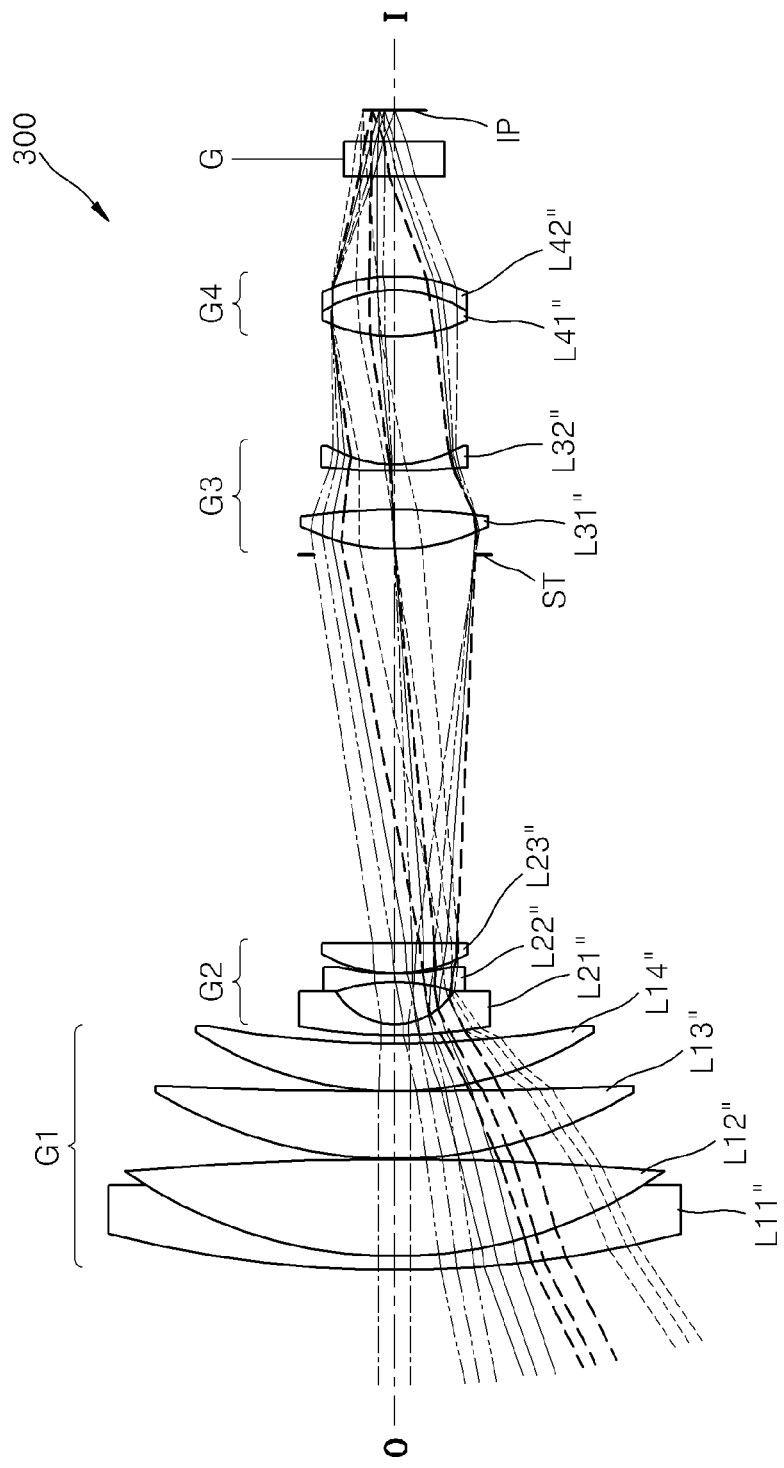
FIG. 7 is a diagram of an optical arrangement of a zoom lens system according to a third exemplary embodiment.

FIGS. 1, 4, and 7 are diagrams of an optical arrangement of zoom lens systems 100, 200, and 300, respectively, according to first, second and third exemplary embodiments.

The zoom lens systems 100, 200, and 300 according to the first, second and third exemplary embodiments of FIGS. 1, 4, and 7, respectively, include a first lens group G1 having positive refractive power, a second lens group G2 having negative refractive power, a third lens group G3 having positive refractive power, and a fourth lens group G4 having positive refractive power in an order from an object O side to an image I side. Also, an aperture ST is disposed between the second lens group G2 and the third lens group G3, and an optical block G is disposed between the fourth lens group G4 and an image plane IP.

In the zoom lens systems 100, 200, and 300, an interval between the first lens group G1 and the second lens group G2 increases, an interval between the second lens group G2 and the third lens group G3 decreases, and an interval between the third lens group G3 and the fourth lens group G4 both decreases and increases during zooming from a wide-mode to a tele-mode. The first lens group G1 and the third lens group G3 may maintain a fixing state, and perform zooming when the second lens group G2 and the fourth lens group G4 move along an optical axis. During zooming from the wide-mode to the tele-mode, the second lens group G2 may move from the object O toward the image I, and the fourth lens group G4 may move from the image I toward the object O and back again toward the image I.

The first lens groups G1 in the zoom lens systems 100, 200, and 300 may include four lenses including one negative lens L11, L11', and L11", respectively, and three positive lenses L12, L13, L14, L12', L13', L14', L12", L13" L14", respectively, in an order from the object O to the image I. The negative lenses L11, L11', and L11" included in the first lens group G1 may have a convex meniscus shape on a side toward the object O near the optical axis. The positive lenses L12, L12', and L12" disposed on a side toward the object O may have bi-convex shapes. The two positive lenses L13, L13', L13", L14, L14', and L14" disposed on a side toward the image I may have convex shapes on a side toward the object O. The negative lens L11, L11', and L11" and the positive lenses L12, L12', and L12" disposed closest to the object O side may form cemented lenses.

According to the above embodiments, the first lens group G1 may appropriately disperse positive refractive power, thereby easily compensating for spherical aberration. Also, the positive lenses L12, L12', L12", L13, L13', L13", L14, L14', and L14" included in the first lens group G1 may include materials having large dispersion values, thereby minimizing lateral chromatic aberration.

The first lens group G1 included in each of the zoom lens systems 100, 200, and 300 according to the embodiments of the present invention may satisfy condition 1 below.

$$0.8 < f_{13}/f_{14} < 1 \qquad \text{[Condition 1]}$$

In Condition 1, $f_{13}$ denotes a focal length of the positive lenses L13, L13', and L13" disposed second among the three positive lenses included in the first lens group G1 from the image I side to the object O side, and $f_{14}$ denotes a focal distance of the positive lenses L14, L14', and L14" disposed closest to the image I side.

Condition 1 above represents a ratio of an appropriate focal distance between the two positive lenses (i.e L13 and L14, L13' and L14', and L13" and L14") included in the first lens group G1 and disposed in the image I. In Condition 1, if the ratio exceeds an upper limit, it is difficult to effectively compensate for chromatic aberration in the tele-mode, and if the ratio is below a lower limit, an overall size of the first lens group G1 increases, which makes it difficult to miniaturize the first lens group G1.

From the object O side toward the image I side, the second lens group G2 includes two negative lenses L21, L21", L22, and L22" and one positive lens L23 and L23". At least one of the negative lenses L21, L21", L22, and L22" included in the second lens group G2 may include one aspheric surface.

In another embodiment as shown in FIG. 4, the second lens group G2 may include three negative lenses L21', L22', and L231' and one positive lens L232'. The negative lens L231' and the positive lens L232' of the second lens group G2 may form a cemented lens L23', thereby easily compensating for chromatic aberration.

The negative lenses L21, L21', and L21" included in the second lens group G2 and disposed closest to the object O side may have meniscus shapes having convex surfaces on a side toward the object O side. The negative lenses L22, L22', and L22" disposed second from the object O side to the image I side may have bi-concave shapes.

The second lens group G2 may have negative refractive power as a whole, plays a greatest role in achieving high magnification of the zoom lens systems 100, 200, and 300, and moves from the object O side toward the image I side during zooming from the wide-mode to the tele-mode.

In an order from the object O side to the image I side, the third lens group G3 may include positive lenses L31, L31', and L31" having aspheric surfaces and negative lenses L32, L32', and L32" having meniscus shapes with convex surfaces on a side toward the object O.

One surface or both surfaces of the positive lenses L31, L31', and L31" may be aspheric surfaces, thereby easily controlling aberration occurring on off-axis.

In an order from the object O side to the image I side, the fourth lens group G4 may include positive lenses L41 and L41" having at least one aspheric surface and negative lenses L41 and L42" having meniscus shapes with convex surfaces on a side toward the image I. The positive lenses L41 and L41" and the negative lenses L41 and L42" may form cemented lenses, thereby easily compensating for lateral chromatic aberration that may occur during zooming.

The positive lenses L41 and L41" included in the fourth lens group G4 may satisfy Condition 2 below.

$$Nd_{41} < 1.56 \quad \text{[Condition 2]}$$

In Condition 2, $Nd_{41}$ denotes a refractive index of the positive lenses L41 and L41" included in the fourth lens group G4. In Condition 2, if the ratio exceeds an upper limit, it may be difficult to control comatic aberration.

In another embodiment as shown in FIG. 4, the fourth lens group G4 may include one negative lens L41' having at least one aspheric surface and two positive lenses L42' and L43'. The negative lens L41' and the positive lens L42' disposed on a side toward the object O may form a cemented lens.

The aperture ST may be disposed between the second lens group G2 and the third lens group G3. The optical block G is disposed between the fourth lens group G4 and the image plane IP. The optical block G may be an optical filter such as a low pass filter (LPF) or an infrared ray (IR) cut filter or cover glass (CG) for protecting image capturing surface of an image capturing device.

Also, the zoom lens systems 100, 200, and 300 according to the exemplary embodiments may satisfy Condition 3 below.

$$4.8 < f_{G3}/f_t < 6.5 \quad \text{[Condition 3]}$$

In Condition 3, $f_{G3}$ denotes a focal distance of the third lens group G3, and $f_t$ denotes an overall focal distance in the tele-mode.

Condition 3 above represents an appropriate range of a ratio of the focal distance of the third lens group G3 with respect to the overall focal length in the tele-mode. In Condition 3, if the ratio is below 4.8, it may be difficult to control astigmatic aberration, and, if the ratio exceeds 6.5, it may be difficult to control comatic aberration.

Also, the zoom lens systems 100, 200, and 300 according to the exemplary embodiments may satisfy Conditions 4 and 5 below.

$$41.5 < f_t/f_w < 44.5 \quad \text{[Condition 4]}$$

$$Fno_w < 1.5 \quad \text{[Condition 5]}$$

In Conditions 4 and 5, $f_t$ denotes the overall focal distance in the telemode, $f_w$ denotes an overall focal distance in the wide-mode, and $Fno_w$ denotes an F number in the wide-mode.

Condition 4 above represents a ratio of the overall focal distance in the tele-mode with respect to the overall focal distance in the wide-mode, i.e., an appropriate magnification range of the zoom lens systems 100, 200, and 300 according to the exemplary embodiments. In Condition 4 above, if the ratio is below a lower limit, it may be difficult to achieve high magnification, and, if the ratio exceeds an upper limit, it may be difficult to control aberration, which deteriorates optical performance, and it may be difficult to achieve overall miniaturization of the zoom lens systems.

Furthermore, Condition 5 above represents an appropriate range of the F number of the zoom lens systems 100, 200, and 300 according to the exemplary embodiments. If the ratio exceeds an upper limit, it may be difficult to achieve a lens system achieving high optical performance.

The zoom lens systems 100, 200, and 300 according to the exemplary embodiments satisfy the above-described constructions and conditions, thereby achieving high magnification and high optical performance. Also, a miniaturized zoom lens system may be achieved, and a sufficient back focal length may be obtained.

The construction of the zoom lens systems 100, 200, and 300 according to the exemplary embodiments will be described in more detail with reference to specific lens data below.

An aspheric surface ASP described throughout the embodiments of the present invention is defined below according to Equation 1.

$$z = \frac{ch^2}{1 + \sqrt{1 - (1+K)c^2h^2}} + Ah^4 + Bh^6 + Ch^8 + Dh^{10} \quad \text{[Equation 1]}$$

In Equation 1 above, z denotes a distance from a peak of a lens in the optical axis direction, h denotes a distance from the optical axis in the direction perpendicular to the optical axis direction, K denotes a conic constant, A, B, C, and D each denotes an aspheric coefficient, and c denotes an inverse number (1/R) of a radius of curvature at the peak of the lens.

In the lens data of Tables 1, 4, and 7 below, Fno denotes an F-number, an effective focal length (EFL) denotes an overall EFL [mm] of the zoom lens system, and D1, D2, D3, and D4 denote variable distances [mm] between lenses.

Also, in design data of Tables 2, 5, and 8 below, R denotes a radius [mm] of curvature of each lens surface (however, a surface having ∞ as a value of R indicates a planar surface), D denotes an interval between lens surfaces in the optical axis direction, Nd denotes a refractive index of each lens, and Vd denotes an Abbe number of each lens.

<First Embodiment>

FIG. 1 is a diagram of an optical arrangement of the zoom lens system 100 according to a first exemplary embodiment. In an order from the object O to the image I, the zoom lens system 100 of the present embodiment includes the first lens group G1 having positive refractive power, the second lens group G2 having negative refractive power, the third lens group G3 having positive refractive power, and the fourth lens group G4 having positive refractive power in an order from the object O to the image I. Also, the aperture ST is disposed between the second lens group G2 and the third lens group G3, and the optical block G is disposed between the fourth lens group G4 and the image plane IP.

A reference numeral $S_i$ of Table 2 indicates an ith surface when a surface of a lens disposed closest to the object O is a first surface S1 and a surface number increases in a direction towards the image plane IP. This applies to the zoom lens systems 200 and 300 according to the other exemplary embodiments.

Table 1 below shows the F number Fno, the focal distance f, and D1, D2, D3, and D4 denote variable distances between lenses during zooming in the first embodiment.

TABLE 1

|  | wide-mode | middle-mode (1) | middle-mode (2) | tele-mode |
|---|---|---|---|---|
| Fno | 1.42 | — | — | 4.88 |
| f | 3.5 | — | — | 150.6 |
| D1 | 0.63 | 12.346 | 24.15 | 26.573 |
| D2 | 28.043 | 16.327 | 4.523 | 2.1 |
| D3 | 10.297 | 6.939 | 4.735 | 16.836 |
| D4 | 7.91 | 11.268 | 13.472 | 1.371 |

Table 2 below shows design data of the first exemplary embodiment.

TABLE 2

| Surface No. | R | D | Nd | Vd |
|---|---|---|---|---|
| S1 | 86.727 | 1.20 | 1.9108 | 35.25 |
| S2 | 27.684 | 7.69 | 1.4970 | 81.61 |
| S3 | −226.838 | 0.15 | | |
| S4 | 32.225 | 5.23 | 1.4970 | 81.61 |
| S5 | 331.981 | 0.15 | | |
| S6 | 26.894 | 3.84 | 1.4970 | 81.61 |
| S7 | 71.833 | D1 | | |
| S8* | 63.800 | 0.64 | 1.8513 | 40.10 |
| S9* | 5.378 | 2.84 | | |
| S10 | −11.258 | 0.60 | 1.8042 | 46.50 |
| S11 | 12.156 | 0.13 | | |
| S12 | 13.382 | 1.86 | 2.0027 | 19.32 |
| S13 | −119.000 | D2 | | |
| ST | Infinity | 0.40 | | |
| S15* | 11.967 | 3.26 | 1.8014 | 45.45 |
| S16* | −80.684 | 2.16 | | |
| S17 | 18.485 | 0.60 | 2.0027 | 19.32 |
| S18 | 9.288 | D3 | | |
| S19* | 11.117 | 3.83 | 1.4971 | 81.56 |
| S20 | −7.624 | 1.27 | 1.8061 | 40.73 |
| S21 | −12.993 | D4 | | |
| S22 | Infinity | 1.50 | 1.5168 | 64.20 |
| S23 | Infinity | 2.02 | | |
| IP | Infinity | 0 | | |

In Table 2 above, * denotes an aspheric surface. Table 3 below shows an aspheric surface coefficient of the first embodiment. E-m (where m is an integer) in a value of the aspheric surface coefficient denotes $\times 10^{-m}$.

TABLE 3

| aspheric surface coefficient | Surface No. | | | | |
|---|---|---|---|---|---|
| | S8 | S9 | S15 | S16 | S19 |
| K | 0.00E+00 | 0.00E+00 | 0.00E+00 | 0.00E+00 | 0.00E+00 |
| A | 0.184317E−03 | 0.894468E−04 | −0.527935E−04 | 0.443072E−04 | −0.156903E−03 |
| B | −0.368864E−05 | 0.214077E−04 | −0.231830E−06 | −0.211906E−08 | 0.589350E−05 |
| C | 0.293634E−07 | −0.119346E−05 | 0.419596E−08 | 0.603431E−08 | −0.330602E−06 |
| D | −0.258564E−09 | 0.347176E−07 | 0.745130E−10 | 0.426997E−10 | 0.764482E−08 |

Figure 2:
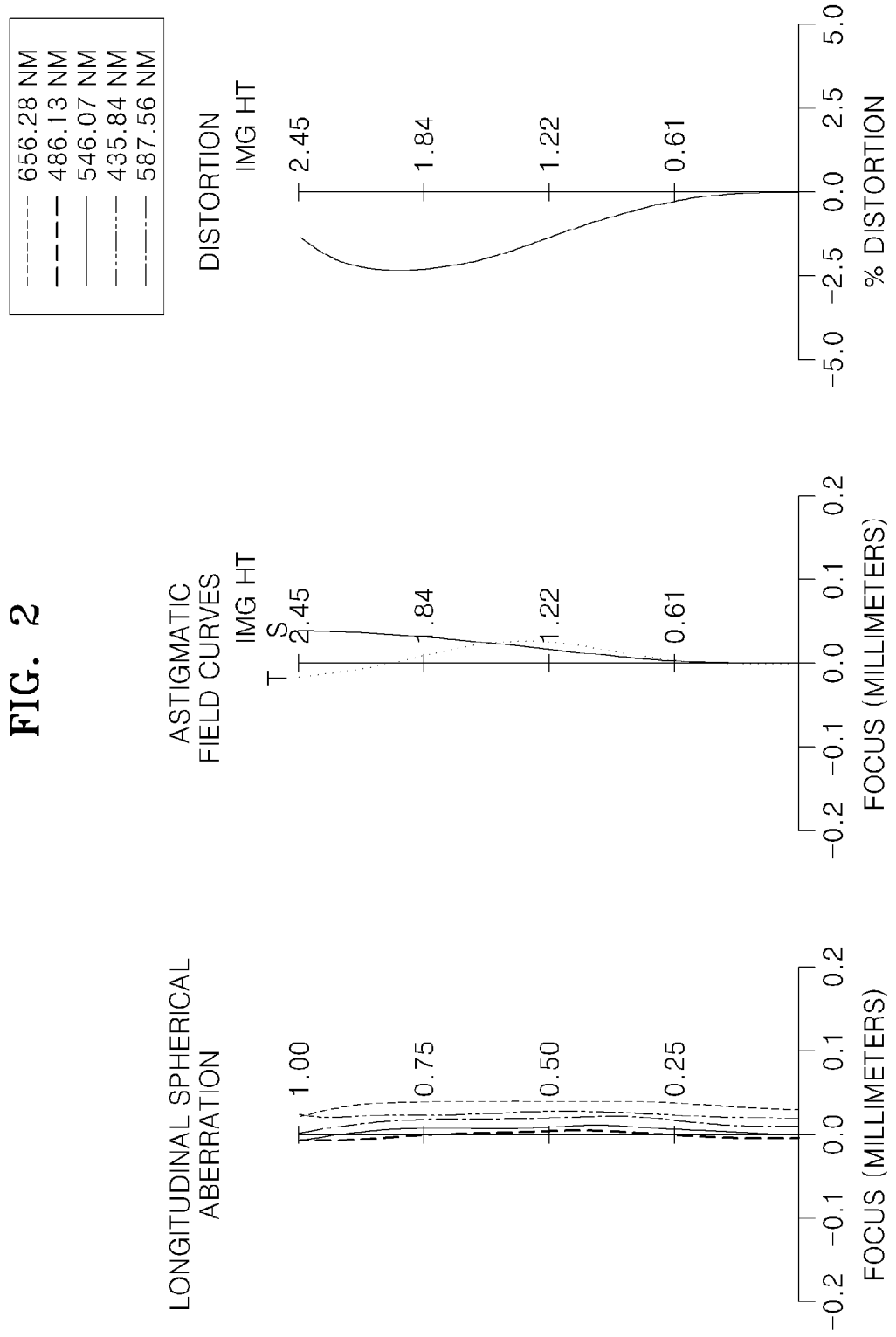
FIG. 2 illustrates longitudinal spherical aberration, astigmatic field curves, and distortion of the zoom lens system of FIG. 1.

FIG. 2 illustrates longitudinal spherical aberration, astigmatic field curves, and distortion of the zoom lens system 100 according to a first exemplary embodiment.

A spherical aberration graph shows spherical aberration of light having wavelengths of 656.28 nm, 587.56 nm, 546.07 nm, 486.13 nm, and 435.84 nm. In an astigmatic field curve graph, a horizontal axis indicates a height of an image plane, and T and S indicate curves of light having a wavelength of 546.07 nm in a tangential surface and a sagittal surface, respectively. A distortion graph shows distortion of light having a wavelength of 546.07 nm.

Figure 3:
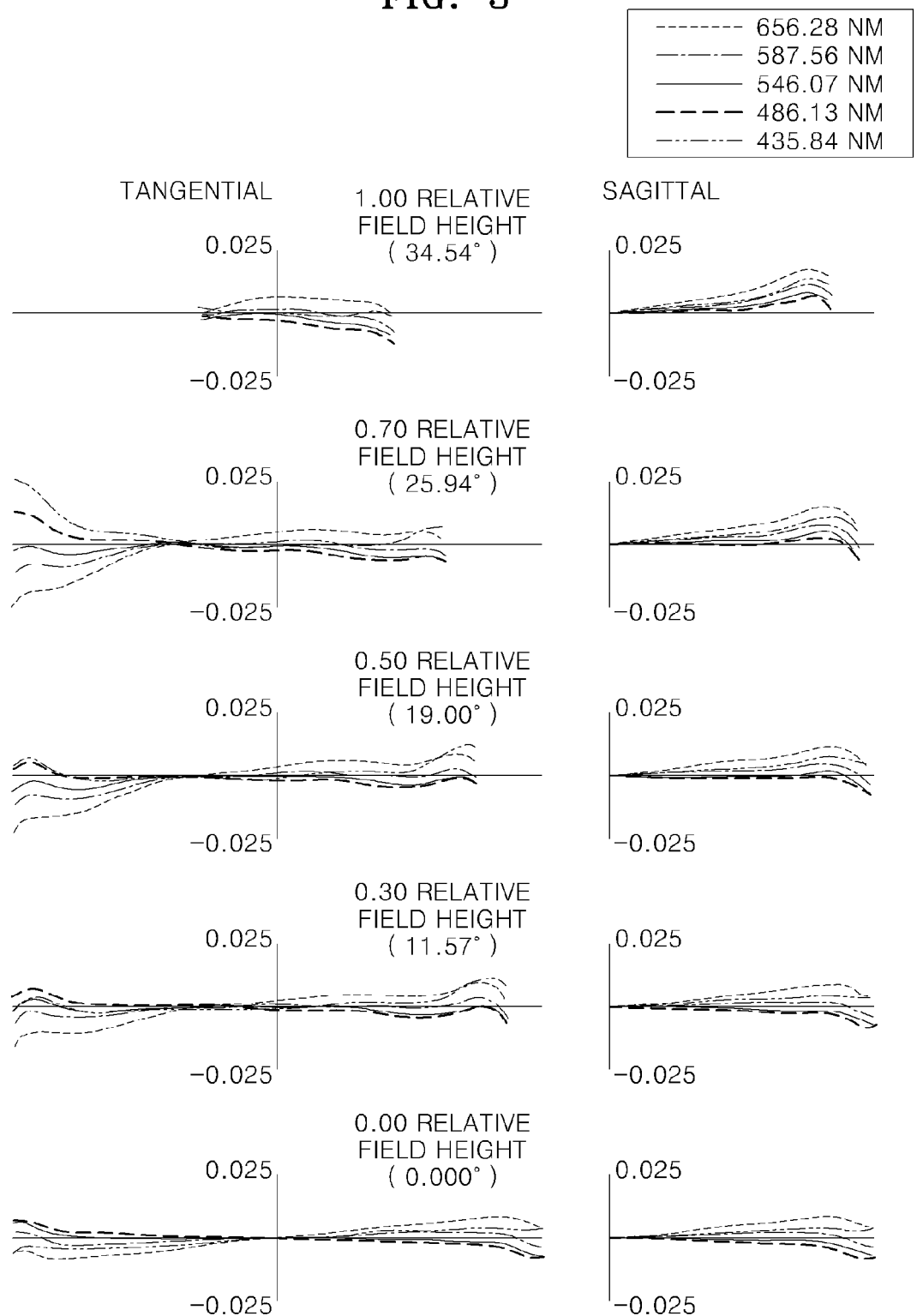
FIG. 3 illustrates lateral aberration of the zoom lens system of FIG. 1.

FIG. 3 illustrates lateral aberration, i.e., comatic aberration with respect to a height of an image plane, of the zoom lens system 100 according to the first exemplary embodiment, which shows aberration of light having wavelengths of 656.28 nm, 587.56 nm, 546.07 nm, 486.13 nm, and 435.84 nm in a tangential surface and a sagittal surface.

<Second Embodiment>

FIG. 4 is a diagram of an optical arrangement of the zoom lens system 200 according to a second exemplary embodiment. The zoom lens system 200 of the present embodiment includes the first lens group G1 having positive refractive power, the second lens group G2 having negative refractive power, the third lens group G3 having positive refractive power, and the fourth lens group G4 having positive refractive power in an order from the object O to the image I. Also, the aperture ST is disposed between the second lens group G2 and the third lens group G3, and the optical block G is disposed between the fourth lens group G4 and the image plane IP.

Table 4 below shows the F number Fno, the focal distance f, and D1, D2, D3, and D4 denote variable distances between lenses during zooming in the second embodiment.

TABLE 4

|  | wide-mode | middle-mode (1) | middle-mode (2) | tele-mode |
|---|---|---|---|---|
| Fno | 1.44 | — | — | 4.89 |
| f | 3.5 | — | — | 150.5 |
| D1 | 0.6490 | 12.6203 | 25.2373 | 27.9647 |
| D2 | 29.1147 | 17.1443 | 4.5274 | 1.7999 |
| D3 | 7.7455 | 4.7640 | 2.8850 | 15.3365 |
| D4 | 7.7909 | 10.7724 | 12.6515 | 0.2 |

Table 5 below shows design data of the second embodiment.

TABLE 5

| Surface No. | R | D | Nd | Vd |
|---|---|---|---|---|
| S1 | 85.181 | 0.80 | 1.9108 | 35.25 |
| S2 | 38.153 | 6.24 | 1.4970 | 81.61 |
| S3 | −237.553 | 0.20 | | |

TABLE 5-continued

| Surface No. | R | D | Nd | Vd |
|---|---|---|---|---|
| S4 | 31.752 | 4.11 | 1.4970 | 81.61 |
| S5 | 303.613 | 0.20 | | |
| S6 | 25.841 | 3.34 | 1.4970 | 81.61 |
| S7 | 81.591 | D1 | | |
| S8* | 62.636 | 0.50 | 1.9108 | 35.25 |
| S9* | 6.918 | 3.09 | | |
| S10 | −22.553 | 0.50 | 1.9037 | 31.32 |
| S11 | 71.328 | 0.32 | | |
| S12 | 407.830 | 0.50 | 1.5298 | 71.41 |
| S13 | 7.381 | 2.38 | 2.0027 | 19.32 |
| S14 | 26.314 | D2 | | |

TABLE 5-continued

| Surface No. | R | D | Nd | Vd |
|---|---|---|---|---|
| ST | Infinity | | | |
| S16* | 10.120 | 3.08 | 1.7323 | 42.72 |
| S17 | −140.955 | 2.98 | | |
| S18 | 25.147 | 0.50 | 1.9229 | 20.88 |
| S19* | 9.705 | D3 | | |
| S20 | 12.211 | 0.50 | 1.8055 | 32.36 |
| S21 | 8.821 | 1.77 | 1.5547 | 70.30 |
| S22 | 19.957 | 0.65 | | |
| S23 | 11.959 | 2.62 | 1.5311 | 74.24 |
| S24 | −14.948 | D4 | | |
| S25 | Infinity | 2.54 | 1.5168 | 64.20 |
| S26 | Infinity | 2.46 | | |
| IP | Infinity | 0 | | |

In Table 5 above, * denotes an aspheric surface. Table 6 below shows an aspheric surface coefficient of the second embodiment. E-m (where m is an integer) in a value of the aspheric surface coefficient denotes×$10^{-m}$.

TABLE 6

| aspheric surface coefficient | Surface No. | |
|---|---|---|
| | S16 | S20 |
| K | −0.841683 | −1.699651 |
| A | −0.767072E−05 | −0.443275E−04 |
| B | −0.109830E−06 | −0.450345E−06 |
| C | 0.442904E−09 | −0.656991E−08 |
| D | 0.000000E+00 | 0.202662E−09 |

Figure 5:
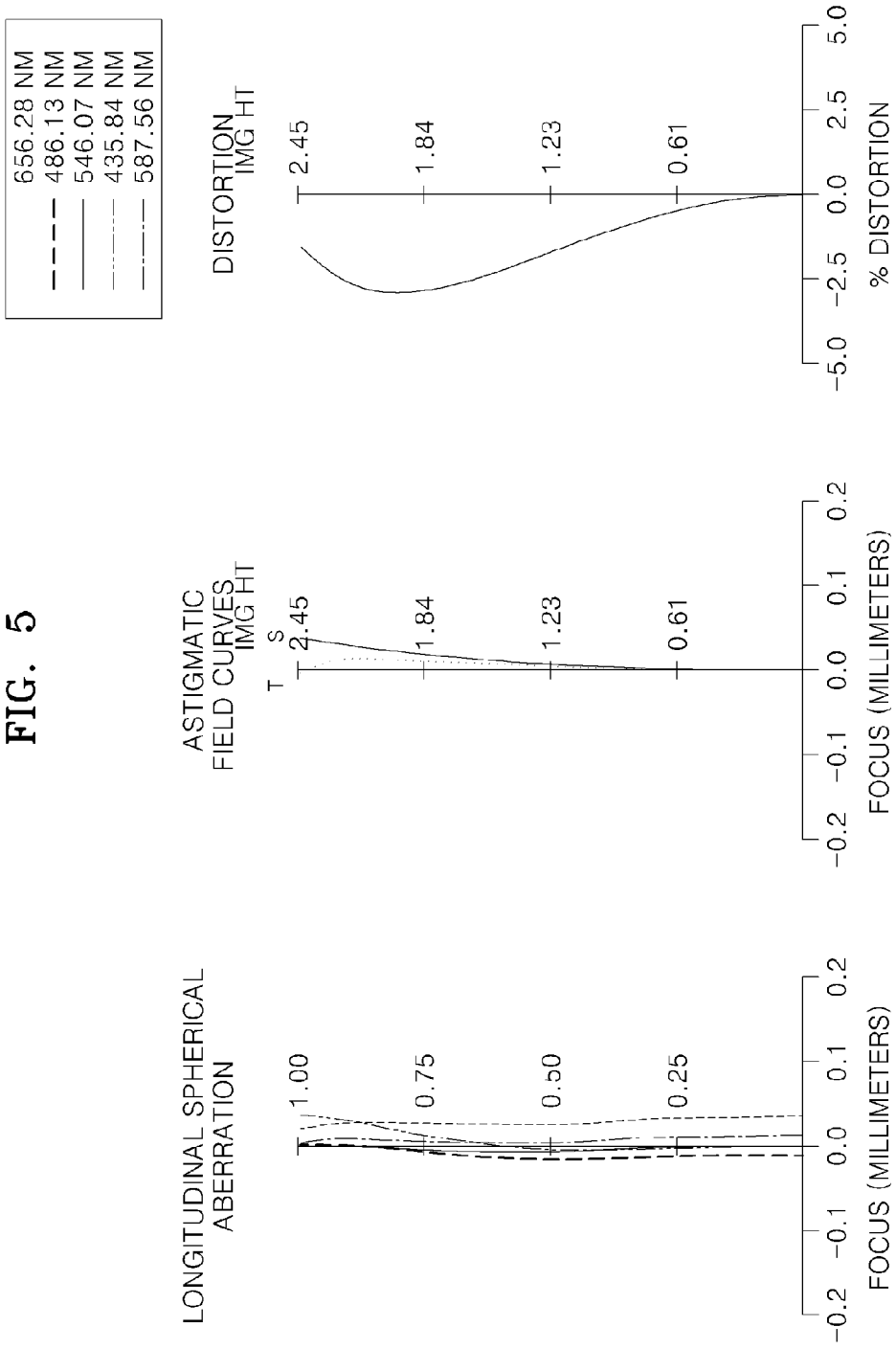
FIG. 5 illustrates longitudinal spherical aberration, astigmatic field curves, and distortion of the zoom lens system of FIG. 4.

FIG. 5 illustrates longitudinal spherical aberration, astigmatic field curves, and distortion of the zoom lens system 200 according to the second exemplary embodiment.

A spherical aberration graph shows spherical aberration of light having wavelengths of 656.28 nm, 587.56 nm, 546.07 nm, 486.13 nm, and 435.84 nm. In an astigmatic field curve graph, a horizontal axis indicates a height of an image plane, and T and S indicate curves of light having a wavelength of 546.07 nm in a tangential surface and a sagittal surface, respectively. A distortion graph shows distortion of light having a wavelength of 546.07 nm.

Figure 6:
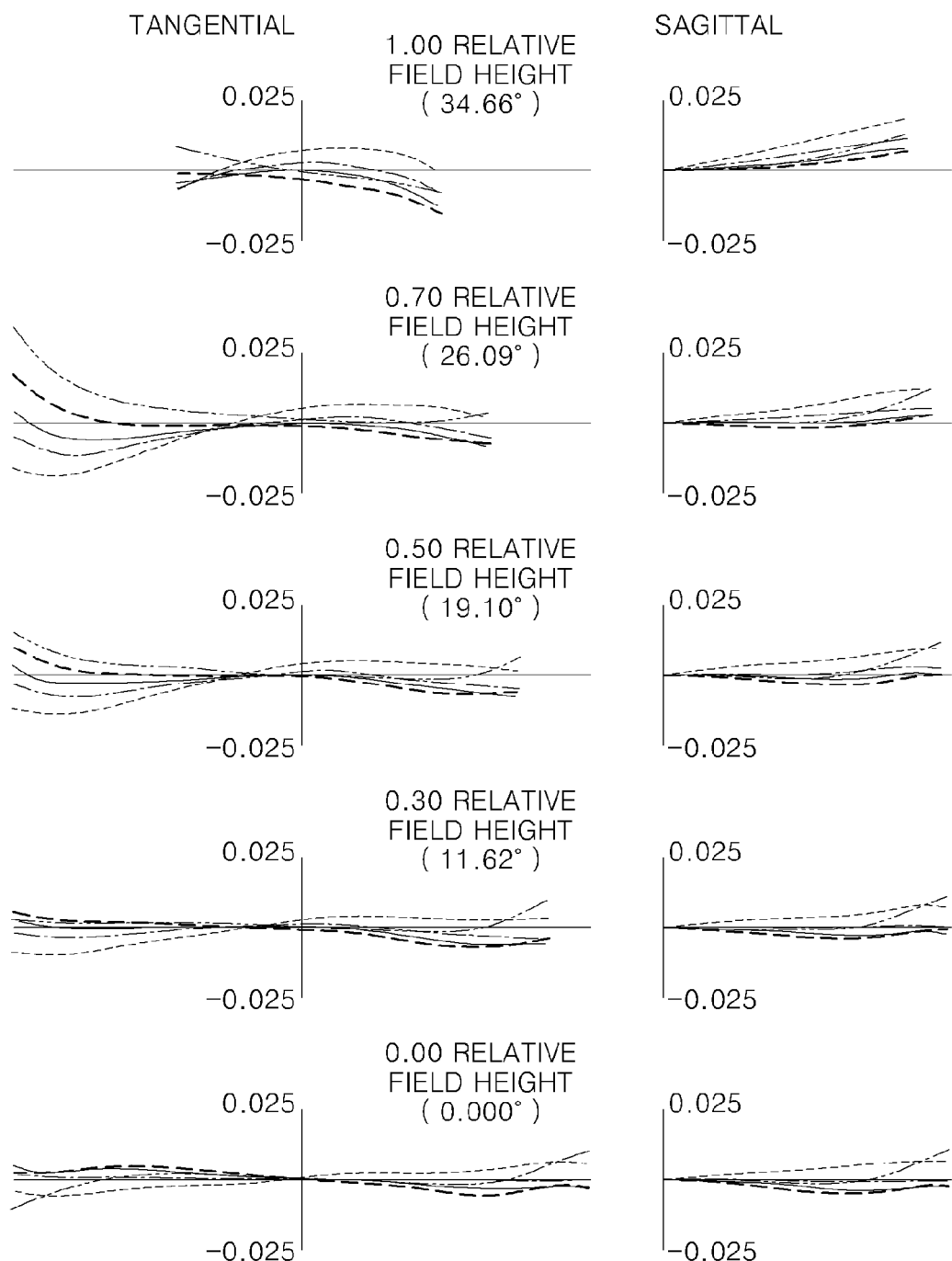
FIG. 6 illustrates lateral aberration of the zoom lens system of FIG. 4.

FIG. 6 illustrates lateral aberration, i.e., comatic aberration with respect to a height of an image plane, of the zoom lens system 200 according to the second embodiment of the present invention, which shows aberration of light having wavelengths of 656.28 nm, 587.56 nm, 546.07 nm, 486.13 nm, and 435.84 nm in a tangential surface and a sagittal surface.

<Third Embodiment>

FIG. 7 is a diagram of an optical arrangement of the zoom lens system 300 according to a third exemplary embodiment. The zoom lens system 300 of the present exemplary embodiment includes the first lens group G1 having positive refractive power, the second lens group G2 having negative refractive power, the third lens group G3 having positive refractive power, and the fourth lens group G4 having positive refractive power in an order from the object O to the image I. Also, the aperture ST is disposed between the second lens group G2 and the third lens group G3, and the optical block G is disposed between the fourth lens group G4 and the image plane IP.

Table 7 below shows the F number Fno, the focal distance f, and the D1, D2, D3, and D4 denote variable distances between lenses during zooming in the third exemplary embodiment.

TABLE 7

| | wide-mode | middle-mode (1) | middle-mode (2) | tele-mode |
|---|---|---|---|---|
| Fno | 1.4 | — | — | 4.9 |
| f | 3.5 | — | — | 150.5 |
| D1 | 0.55 | 12.7902 | 25.5561 | 27.8316 |
| D2 | 28.8816 | 16.6414 | 3.8755 | 1.6000 |
| D3 | 9.5603 | 6.8057 | 6.3021 | 16.9760 |
| D4 | 7.5657 | 10.3203 | 10.8239 | 0.15000 |

Table 8 below shows design data of the third embodiment.

TABLE 8

| Surface No. | R | D | Nd | Vd |
|---|---|---|---|---|
| S1 | 84.535 | 1.00 | 1.9108 | 35.25 |
| S2 | 35.017 | 7.08 | 1.4970 | 81.61 |
| S3 | −275.299 | 0.15 | | |
| S4 | 34.096 | 4.88 | 1.4970 | 81.61 |
| S5 | 285.75 | 0.15 | | |
| S6 | 27.414 | 3.61 | 1.4970 | 81.61 |
| S7 | 75.347 | D1 | | |
| S8* | 38.655 | 0.70 | 1.8820 | 37.22 |
| S9* | 5.230 | 3.27 | | |
| S10 | −14.233 | 0.50 | 1.8042 | 46.50 |
| S11 | 18.371 | 0.15 | | |
| S12 | 12.804 | 2.06 | 2.0027 | 19.32 |
| S13 | −647.074 | D2 | | |
| ST | Infinity | 0.40 | | |
| S15* | 13.294 | 2.86 | 1.8820 | 37.22 |
| S16* | −71.961 | 2.90 | | |
| S17 | 35.771 | 0.50 | 2.0027 | 19.32 |
| S18 | 10.271 | D3 | | |
| S19* | 11.856 | 3.37 | 1.5547 | 60.71 |
| S20 | −9.835 | 1.00 | 1.9459 | 17.98 |
| S21 | −12.984 | D4 | | |
| S22 | Infinity | 2.54 | 1.5168 | 64.20 |
| S23 | Infinity | 2.31 | | |
| IP | Infinity | 0 | | |

In Table 8 above, * denotes an aspheric surface. Table 9 below shows an aspheric surface coefficient of the third embodiment. E-m (m is an integer) in a value of the aspheric surface coefficient denotes×$10^{-m}$.

TABLE 9

| Aspheric surface coefficient | Surface No. | | |
|---|---|---|---|
| | S9 | S15 | S19 |
| K | 0.00E+00 | 0.00E+00 | 0.00E+00 |
| A | −0.970631E−04 | −0.677600E−04 | −0.194834E−03 |
| B | 0.710417E−05 | −0.334416E−06 | 0.637960E−06 |
| C | −0.365670E−06 | 0.627489E−10 | −0.269615E−07 |
| D | 0.00E+00 | 0.00E+00 | 0.00E+00 |

Figure 8:
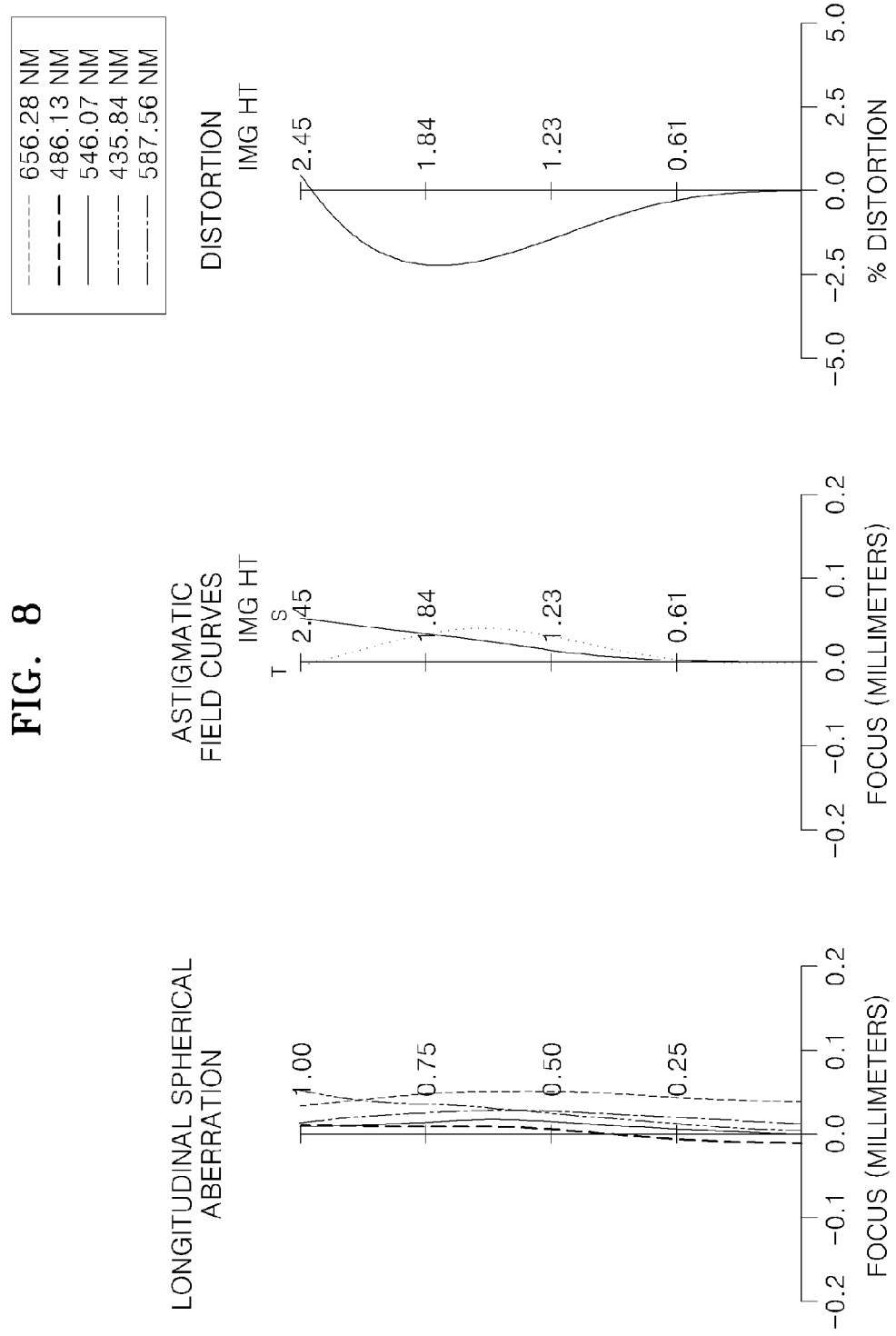
FIG. 8 illustrates longitudinal spherical aberration, astigmatic field curves, and distortion of the zoom lens system of FIG. 7.

FIG. 8 illustrates longitudinal spherical aberration, astigmatic field curves, and distortion of the zoom lens system 300 according to the third exemplary embodiment.

A spherical aberration graph shows spherical aberration of light having wavelengths of 656.28 nm, 587.56 nm, 546.07 nm, 486.13 nm, and 435.84 nm. In an astigmatic field curve graph, a horizontal axis indicates a height of an image plane, and T and S indicate curves of light having a wavelength of 546.07 nm in a tangential surface and a sagittal surface, respectively. A distortion graph shows distortion of light having a wavelength of 546.07 nm.

Figure 9:
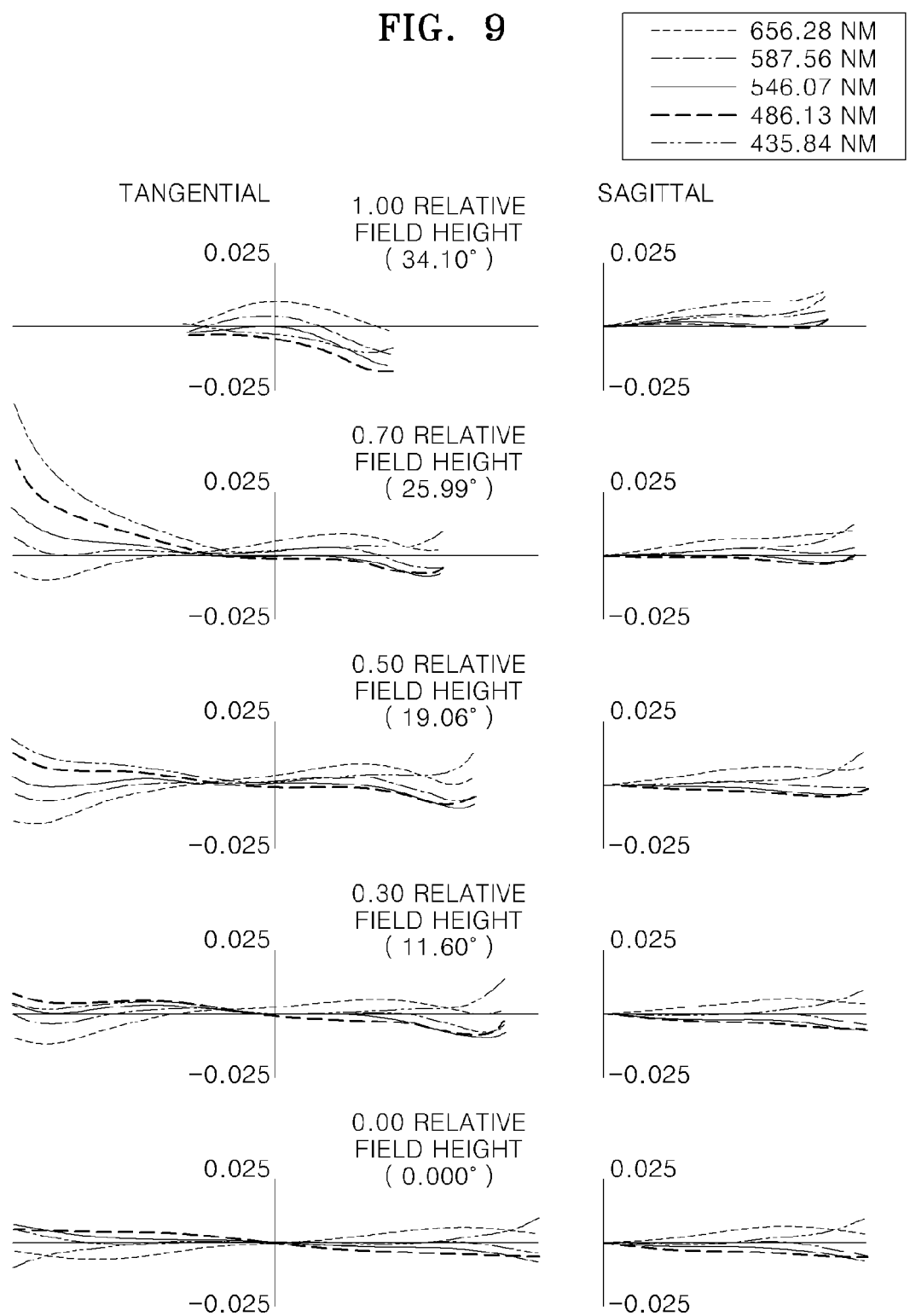
FIG. 9 illustrates lateral aberration of the zoom lens system of FIG. 7.

FIG. 9 illustrates lateral aberration, i.e., comatic aberration with respect to a height of an image plane, of the zoom lens system 300 according to the third exemplary embodiment, which shows aberration of light having wavelengths of 656.28 nm, 587.56 nm, 546.07 nm, 486.13 nm, and 435.84 nm in a tangential surface and a sagittal surface.

Table 10 below shows that the above-described first, second and third exemplary embodiments satisfy the above-described conditions.

TABLE 10

|  | First Embodiment | Second Embodiment | Third Embodiment |
|---|---|---|---|
| $0.8 < f_{13}/f_{14} < 1$ | 0.84 | 0.96 | 0.91 |
| $4.8 < f_{3G}/f_t < 6.5$ | 6.11 | 4.90 | 4.94 |
| $41.5 < f_t/f_w < 44.5$ | 43.03 | 43.00 | 43.00 |
| $Fno_w < 1.5$ | 1.42 | 1.44 | 1.40 |

The zoom lens systems 100, 200, and 300 according to the exemplary embodiments may have high optical performance while achieving high magnification. Also, bright and miniaturized zoom lens systems may be achieved, and a sufficient back focal distance may be obtained.

The zoom lens systems 100, 200, and 300 according to the exemplary embodiments may be applied as photographing optical systems of a photographing apparatus such as a surveillance camera including an image sensor, a digital camera, or a video camera.

Figure 10:
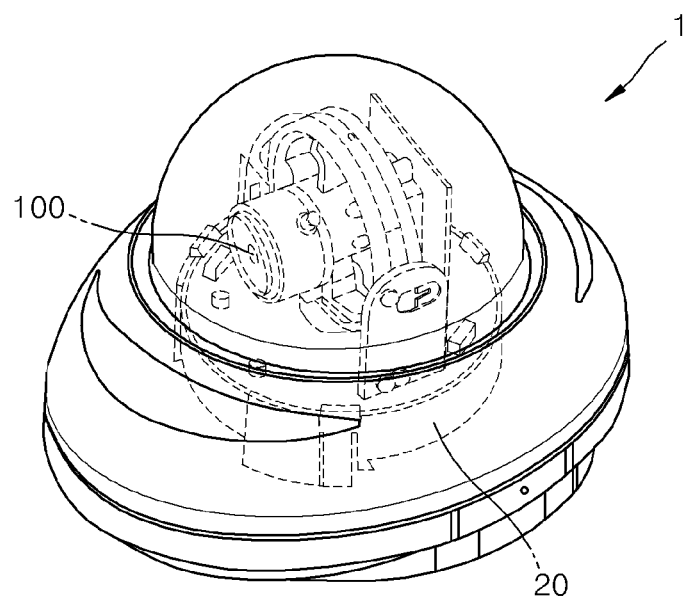
FIG. 10 is a schematic perspective view of a photographing apparatus including the zoom lens system of FIG. 1 according to an exemplary embodiment.

FIG. 10 is a schematic perspective view of a photographing apparatus 1 including the zoom lens system 100 according to an exemplary embodiment.

The photographing apparatus 1 includes the zoom lens system 100 according to the first exemplary embodiment and an image sensor 20 that receives light formed by the zoom lens system 100.

The image sensor 20 may be a solid image capturing device such as a charge-coupled device (CCD) or a complementary metal-oxide semiconductor (CMOS) that receives light via the zoom lens system 100 and converts the light into an electrical signal. An image capturing surface of the image sensor 20 corresponds to the image plane IP of a zoom lens, The photographing apparatus 1 generates a digital image from the electrical signal, and records the digital image in a recording medium, for example, a hard disk drive (HDD), a memory card, an optical disk, a magnetic tape, etc. Meanwhile, in a case where the photographing apparatus 1 is a film camera, the image plane IP corresponds to a film surface.

According to the exemplary embodiments, a zoom lens system that achieves high magnification and has high optical performance and a photographing apparatus including the zoom lens system may be provided.

Also, a zoom lens system that achieves miniaturization and obtains a sufficient back focal distance and a photographing apparatus including the zoom lens system may be provided.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A zoom lens system comprising, sequentially from an object to an image:
    a first lens group having positive refractive power;
    a second lens group having negative refractive power;
    a third lens group having positive refractive power; and
    a fourth lens group having positive refractive power,
    wherein an interval between the first lens group and the second lens group, an interval between the second lens group and the third lens group, and an interval between the third lens group and the fourth lens group change during zooming from a wide-mode to a tele-mode,
    wherein the first lens group comprises one negative lens and three positive lenses sequentially from the object to the image,
    wherein the zoom lens system satisfies a condition below:

$0.8 f_{13}/f_{14} < 1$, and wherein $f_{13}$ denotes a focal length of a positive lens of the first lens group disposed second from the image to the object, and $f_{14}$ denotes a focal distance of a positive lens of the first lens group disposed closest to the image.

2. The zoom lens system of claim 1, satisfying a condition below:

$4.8 < f_{G3}/f_t < 6.5$, wherein $f_{G3}$ denotes a focal length of the third lens group and $f_t$ denotes an overall focal length at the tele-mode.

3. The zoom lens system of claim 1, satisfying a condition below:

$41.5 < f_t/f_w < 44.5$, wherein $f_t$ denotes an overall focal length at the tele-mode, and $f_w$ denotes an overall focal length at the wide-mode.

4. The zoom lens system of claim 1, satisfying a condition below:

$Fno_w < 1.5$, wherein $Fno_w$ denotes an F number at the wide-mode.

5. The zoom lens system of claim 1, wherein the third lens group comprises a positive lens and a negative lens,
    wherein the positive lens comprises at least one aspheric surface.

6. The zoom lens system of claim 1, wherein during the zooming from the wide-mode to the tele-mode, the second and fourth lens groups move along an optical axis and the first and third lens groups are fixed.

7. The zoom lens system of claim 1 further comprising an aperture disposed between the second lens group and the third lens group.

8. The zoom lens system of claim 1, wherein the second lens group comprises two negative lenses and one positive lens sequentially from the object to the image.

9. The zoom lens system of claim 8, wherein at least one of the two negative lenses included in the second lens group comprises an aspheric surface.

10. The zoom lens system of claim 1, wherein the second lens group comprises three negative lenses and one positive lens sequentially from the object to the image.

11. The zoom lens system of claim 10, wherein a negative lens and the positive lens that are included in the second lens group and disposed closest to the image form a cemented lens.

12. The zoom lens system of claim 1, wherein the fourth lens group comprises a positive lens and a negative lens sequentially from the object to the image.

13. The zoom lens system of claim 12, wherein the positive lens included in the fourth lens group satisfies a condition below:

$Nd_{41} < 1.56$, wherein $Nd_{41}$ denotes a refractive index of the positive lens included in the fourth lens group.

14. The zoom lens system of claim 12, wherein the positive lens included in the fourth lens group comprises at least one aspheric surface.

15. The zoom lens system of claim 1, wherein the fourth lens group comprises one negative lens and two positive lenses sequentially from the object to the image.

16. The zoom lens system of claim 15, wherein the negative lens included in the fourth lens group comprises at least one aspheric surface.

17. The zoom lens system of claim 1, wherein the interval between the first lens group and the second lens group increases, the interval between the second lens group and the third lens group decreases, and the interval between the third lens group and the fourth lens group changes during the zooming from the wide-mode to the tele-mode.

18. The zoom lens system of claim 17, wherein the interval between the third lens group and the fourth lens group increases and decreases during the zooming from the wide-mode to the tele-mode.

19. A photographing apparatus comprising:
   the zoom lens system of claim 1; and
   an image sensor which receives light from the zoom lens system.

* * * * *